(12) United States Patent
Nagata (10) Patent No.: US 8,311,195 B2
(45) Date of Patent: Nov. 13, 2012

(54) COMMUNICATION TERMINAL APPARATUS

(75) Inventor: Keisuke Nagata, Osaka (JP)

(73) Assignee: Kyocera Corporation, Kyoto (JP)

( * ) Notice: Subject to any disclaimer, the term of this patent is extended or adjusted under 35 U.S.C. 154(b) by 1263 days.

(21) Appl. No.: 12/078,292

(22) Filed: Mar. 28, 2008

(65) Prior Publication Data

US 2008/0247527 A1 Oct. 9, 2008

(30) Foreign Application Priority Data

Mar. 29, 2007 (JP) .................................. 2007-089494

(51) Int. Cl.
- *H04M 1/56* (2006.01)
- *H04M 15/06* (2006.01)
- *H04M 3/42* (2006.01)

(52) U.S. Cl. ................................ 379/142.06; 455/415

(58) Field of Classification Search ............ 379/142.01, 379/142.04–142.07, 142.15, 210.02–210.03, 379/88.11–88.13, 88.18–88.21; 455/412.02, 455/413, 415; 715/751, 752

See application file for complete search history.

(56) References Cited

U.S. PATENT DOCUMENTS

| | | | | |
|---|---|---|---|---|
| 5,905,774 A | * | 5/1999 | Tatchell et al. ............ | 379/88.04 |
| 6,738,462 B1 | * | 5/2004 | Brunson .................. | 379/142.06 |
| 2006/0234770 A1 | * | 10/2006 | Tsukamoto ............... | 455/556.2 |
| 2007/0201653 A1 | * | 8/2007 | Tsukamoto ............. | 379/142.06 |

FOREIGN PATENT DOCUMENTS

| | | |
|---|---|---|
| JP | 2001-111675 | 4/2001 |
| JP | 2001111675 | 4/2001 |
| JP | 2004179914 | 4/2001 |
| JP | 2002171332 | 6/2002 |

OTHER PUBLICATIONS

Office Action in Japanese Patent Application No. 2007089494, mailed Feb. 15, 2011, 5 pages.

* cited by examiner

*Primary Examiner* — Quoc D Tran
(74) *Attorney, Agent, or Firm* — Duane Morris LLP; Richard C. Kim (57) ABSTRACT

The present invention provides a communication terminal apparatus comprising: an application execution unit operable to perform prescribed operations for communications; an address book updating unit operable to update first party information included in an address book to second party information, the address book being stored on an address book storage medium and including one or more pieces of party information and one or more names in one-to-one correspondence; and an application information updating unit operable to update a piece of party information that is stored on an application information storage medium and the same as the first party information to the second party information according to the updating by the address book updating unit, the application information storage medium storing thereon one or more pieces of party information and being referred to by the application execution unit.

2 Claims, 11 Drawing Sheets

| | | | | |
|---|---|---|---|---|
| REGISTRATION NUMBER | 001 | 002 | ... | 100 |
| NAME | USER A | USER B | | STORE S |
| TELEPHONE NUMBER 1 | 0611111111 | 09033333333 | | 0388888888 |
| TELEPHONE NUMBER 2 | 09022222222 | — | | 09099999999 |
| MAIL ADDRESS 1 | A@AAA.ne.jp | B@CCC.ne.jp | | S@YYY.or.jp |
| MAIL ADDRESS 2 | A@BBB.or.jp | — | | — |
| ... | ... | ... | | ... |

FIG. 3A 3100  3110  3120  3130

| INCOMING CALL ITEM NUMBER | CALLER'S TELEPHONE NUMBER | RECEPTION TIME |
|---|---|---|
| 001 | 0611111111 | 2007/03/30 12:32 |
| 002 | 09033333333 | 2007/03/29 10:02 |
| 003 | 09033333333 | 2007/03/29 09:21 |
| 004 | 09088888888 | 2007/03/25 21:12 |
| 005 | 07509876543 | 2007/03/25 10:54 |
| ⋮ | ⋮ | ⋮ |

FIG. 3B 3200  3210  3220  3230

| INCOMING MAIL ITEM NUMBER | SENDER'S MAIL ADDRESS | TITLE |
|---|---|---|
| 001 | B@CCC.ne.jp | ABOUT THE MEETING |
| 002 | A@BBB.or.jp | DOCUMENTATION |
| 003 | B@CCC.ne.jp | ADDITIONAL INFORMATION |
| 004 | B@CCC.ne.jp | TIME TO MEET |
| 005 | C@DDD.ne.jp | LUNCH |
| ⋮ | ⋮ | ⋮ |

FIG. 3C 3300  3330

| BLOCKED TELEPHONE NUMBER |
|---|
| 05066666666 |

| | INCOMING CALL HISTORY |
|---|---|
| | 6/500 |
| 001 | USER A |
| 002 | USER B ← |
| 003 | USER B ← 5000 |
| 004 | STORE S |
| 005 | USER C |
| 006 | USER D |
| | MENU |

FIG. 5B

| | INCOMING MAIL HISTORY |
|---|---|
| 001 | USER B ← 6000 |
| | TITLE: ABOUT THE MEETING |
| 002 | USER A |
| | TITLE: DOCUMENTATION |
| 003 | USER B |
| | TITLE: ADDITIONAL INFORMATION |
| 004 | USER B |
| | TITLE: TIME TO MEET |
| | MENU |

FIG. 6

| | | | | |
|---|---|---|---|---|
| REGISTRATION NUMBER | 001 | 002 | | 100 |
| NAME | USER A | USER B | | STORE S |
| TELEPHONE NUMBER 1 | 0611111111 | 09012345678 | | 0388888888 |
| TELEPHONE NUMBER 2 | 09022222222 | — | | 09099999999 |
| MAIL ADDRESS 1 | A@AAA.ne.jp | B@CCC.ne.jp | | S@YYY.or.jp |
| MAIL ADDRESS 2 | A@BBB.or.jp | — | | — |
| ... | ... | ... | | ... |

FIG. 7A

INCOMING CALL HISTORY
6/500
001 USER A
002 09033333333
003 09033333333 ← 5010
004 STORE S
005 USER C
006 USER D
MENU

FIG. 7B

INCOMING MAIL HISTORY
001 USER B ← 6000
TITLE: ABOUT THE MEETING
002 USER A
TITLE: DOCUMENTATION
003 USER B
TITLE: ADDITIONAL INFORMATION
004 USER B
TITLE: TIME TO MEET
MENU

| INCOMING CALL ITEM NUMBER | CALLER'S TELEPHONE NUMBER | RECEPTION TIME |
|---|---|---|
| 001 | 0611111111 | 2007/03/30 12:32 |
| 002 | 09012345678 | 2007/03/29 10:02 |
| 003 | 09012345678 | 2007/03/29 09:21 |
| 004 | 09088888888 | 2007/03/25 21:12 |
| 005 | 07509876543 | 2007/03/25 10:54 |
| ⋮ | ⋮ | ⋮ |

Table 2195:

| REGISTRATION NUMBER | 001 |
|---|---|
| NAME | USER A |
| TELEPHONE NUMBER 1 | 0611111111 |
| TELEPHONE NUMBER 2 | 09022222222 |
| TELEPHONE NUMBER 3 | 09033333333 |
| MAIL ADDRESS 1 | A@BBB.or.jp |
| ⋮ | ⋮ |

2196 →

|  | 001 |
|---|---|
|  | USER A |
|  | 0611111111 |
|  | DELETED |
|  | 09033333333 |
|  | A@BBB.or.jp |
|  | ⋮ |

FIG. 11B

Table 3195:

| INCOMING CALL ITEM NUMBER | CALLER'S TELEPHONE NUMBER |
|---|---|
| 001 | 0611111111 |
| 002 | 09022222222 |
| 003 | 09033333333 |
| 004 | 09088888888 |
| 005 | 07509876543 |
| ⋮ | ⋮ |

3196 →

| CALLER'S TELEPHONE NUMBER |
|---|
| 0611111111 |
| 09033333333 |
| 09033333333 |
| 09088888888 |
| 07509876543 |
| ⋮ |

COMMUNICATION TERMINAL APPARATUS

BACKGROUND OF THE INVENTION (1) Field of the Invention

The present invention relates to functions of communication terminal apparatuses, such as a call function and a mail function, and particularly to improvement of convenience for the case telephone numbers and email addresses are changed.

(2) Description of the Related Art

Communication terminal apparatuses of recent years, such as portable telephones, are equipped with an address book for storing telephone numbers, mail addresses and names and so on in association with each other.

With such communication terminal apparatuses, the user can make a telephone call or send a mail by designating a name or the like in the address book. For example, to make a telephone call, it is unnecessary for the user to keep the telephone number in mind or input the telephone number.

When displaying histories such as an incoming call history, the communication terminal apparatuses display names of callers instead of the telephone numbers, so that the user can immediately identify the callers. Besides, a technique for displaying the incoming call history with changing character colors has been disclosed. This technique enables the user to know whether the user has responded to the calls included in the incoming call history.

However, regarding calls from telephone numbers that are not registered in the address book, the incoming call history shows the telephone numbers as they are.

However, it sometimes happens that the incoming call history does not show names, etc. of callers even though the callers are registered in the address book.

This is when the telephone numbers in the address book have been updated.

The new numbers in the address book are different from the old numbers that existed in the address book before the updating.

The old numbers will remain in the incoming call history, even after the updating. Accordingly, regarding the history of the calls received before the updating, the telephone apparatus considers the old numbers as being not registered in the address book. As a result, the incoming call history shows the old numbers as they are.

SUMMARY OF THE INVENTION

To solve the problem, the present invention provides a communication terminal apparatus comprising: an application execution unit operable to perform prescribed operations for communications; an address book updating unit operable to update first party information included in an address book to second party information, the address book being stored on an address book storage medium and including one or more pieces of party information and one or more names in one-to-one correspondence; and an application information updating unit operable to update a piece of party information that is stored on an application information storage medium and the same as the first party information to the second party information according to the updating by the address book updating unit, the application information storage medium storing thereon one or more pieces of party information and being referred to by the application execution unit.

The present invention also provides an address book updating method used by a communication terminal apparatus that includes an application execution unit that performs prescribed operations for communications, the address book updating method comprising: an address book updating step of updating first party information included in an address book to second party information, the address book being stored on an address book storage medium and including one or more pieces of party information and one or more names in one-to-one correspondence; and an application information updating step of updating a piece of party information that is stored on an application information storage medium and the same as the first party information to the second party information according to the updating performed in the address book updating step, the application information storage medium storing thereon one or more pieces of party information and being referred to by the application execution unit.

The present invention also provides a computer program used by a communication terminal apparatus to perform address book update processing, the terminal apparatus including an application execution unit that performs prescribed operations for communications, the computer program comprising: an address book updating step of updating first party information included in an address book to second party information, the address book being stored on an address book storage medium and including one or more pieces of party information and one or more names in one-to-one correspondence; and an application information updating step of updating a piece of party information that is stored on an application information storage medium and the same as the first party information to the second party information according to the updating performed in the address book updating step, the application information storage medium storing thereon one or more pieces of party information and being referred to by the application execution unit.

Here, the application is what realizes functions of the communication terminal by instructing the processor to execute a computer program.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 6 shows an example of the address book 2100 where a telephone number has been changed;

DESCRIPTION OF THE PREFERRED EMBODIMENTS

The First Embodiment

<Outline>

As an example of a history record, an incoming call history of related art is used for recording telephone numbers of incoming calls.

On the other hand, the portable telephone apparatus as an embodiment of the present invention attempts to show a history that identifies the callers of incoming calls and the senders of incoming mails, instead a history that simply shows the telephone numbers of the callers of the incoming calls and the mail addresses of the incoming mails.

The portable telephone apparatus as an embodiment of the present invention manages the history based on a concept that "it is more important that the history enables the user to identify the callers, than it shows the telephone numbers of the callers of the incoming calls". This concept also applies to outgoing telephone calls and transmission and reception of mails. The following explains the present invention by taking a case of telephone numbers as an example.

If a telephone number stored in the history is an old number that has not been updated, the present invention replaces the old number with the new number.

In other words, it is possible for the portable telephone apparatus to provide the history that shows the names registered in the address book by replacing the old number in the history with the new number. This enables the user of the portable telephone apparatus to immediately identify the callers even if the user does not remember the old number.

Further, with such a portable telephone apparatus, when calling back to a caller with use of the history of an incoming call originated from the old number, the user can call back to the new number by usual operations.

The advantageous effect of the portable telephone apparatus as an embodiment of the present invention is not limited to that on the incoming call history. It is possible to replace telephone numbers to be blocked and so on with new numbers to prevent the portable telephone apparatus from not executing its intended function properly due to the user forgetting to change the configuration of the function. In other words, it becomes unnecessary for the user to bother to change the configurations for applications that cooperate with the address book. More specifically, the communication terminal apparatus as an embodiment of the present invention is capable of automatically reflecting changes in the address book to the information referred to by the application. As a result, the application operates based on the updated information. In other words, with the stated communication terminal apparatus, it is unnecessary for the user to manually change the data for the application according to the change in the address book.

The following explains a portable telephone apparatus as an embodiment of the present invention.

<Structure>

Figure 1:
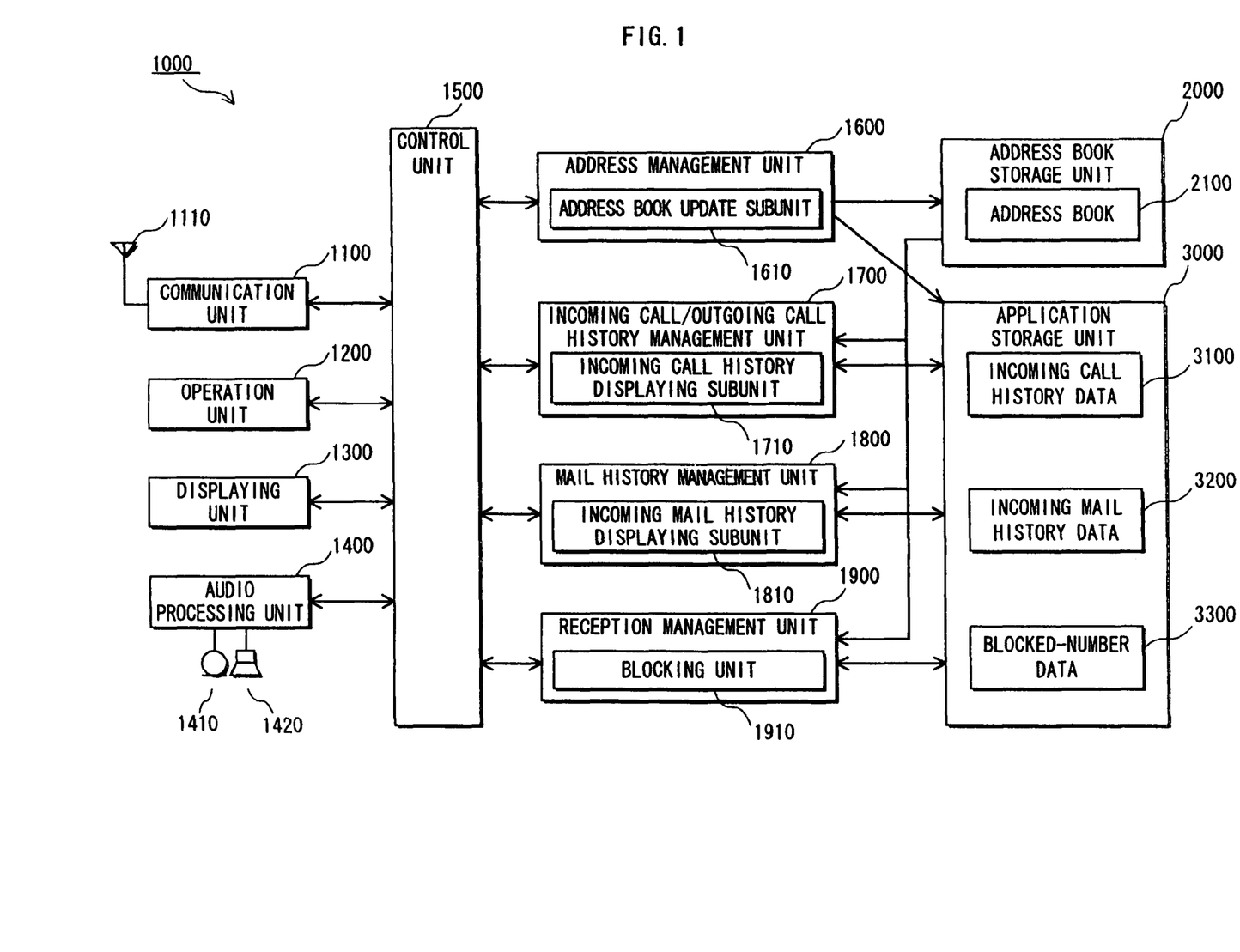
FIG. 1 is a functional block diagram showing the structure of a portable telephone apparatus as an embodiment of the present invention.

Firstly, the structure of the portable telephone apparatus as an embodiment of the present invention is described below with reference to FIG. 1. FIG. 1 is a functional block diagram showing the structure of the portable telephone apparatus.

A portable telephone apparatus 1000 includes a communication unit 1100 equipped with an antenna 1110, an operation unit 1200, a displaying unit 1300, an audio processing unit 1400 equipped with a microphone 1410 as an external audio input and a speaker 1420 as an audio signal output, a control unit 1500, an address book management unit 1600, an incoming/outgoing call history management unit 1700, a mail history management unit 1800, a reception management unit 1900, an address book storage unit 2000, and an application storage unit 3000.

The control unit 1500 includes a CPU, a memory and so on, which are not illustrated, and performs general control processing required for portable telephone apparatuses, such as processing of calls, reception/transmission of mails, transmission of response messages, and recording of message notes.

The communication unit 1100 includes a demodulation circuit, a signal processing circuit and so on, and has a function to communicate with a base station (not illustrated) according to instructions from the control unit 1500.

The operation unit 1200 includes keys, buttons and so on, and has a function to detect user's operations such as holding down of a button, and notifies the control unit 1500 of the operations.

The displaying unit 1300 includes a display such as a liquid crystal display, and has a function to display a menu, a mail and soon on the display according to instructions from the control unit 1500.

The audio processing unit 1400 has a function to encode voice communication as digital data and perform modulation/demodulation and so on. The audio processing unit also has a function to output a ringtone and so on according to instructions from the control unit 1500.

The address book storage unit 2000 has a function to store therein an address book 2100. The application storage unit 3000 has a function to store therein data that various types of applications refer to when they are executed.

In this embodiment, it is assumed that the application storage unit 3000 stores therein incoming call history data 3100, incoming mail history data 3200, and blocked-number data 3300.

The incoming call history data 3100 is data of a history of received calls. The incoming mail history data 3200 is data of a history of received mails. The blocked-number data 3300 is data of telephone numbers from which calls are to be blocked. Details of these pieces of data are described in the <Data> section below.

The address book management unit 1600 includes an address book update subunit 1610, and has functions to perform registration of addresses into the address book 2100, updating and deletion of addresses included in the address book 2100, and so on. Among the functions of the address book management unit 1600, the address book update subunit 1610 plays the function to update addresses in the address book 2100. The address book 2100 includes names, telephone numbers, mail addresses and so on.

The incoming/outgoing call history management unit 1700 includes an incoming call history displaying subunit 1710, and has a function to manage histories of incoming calls and outgoing calls. More specifically, the incoming/outgoing call history management unit 1700 has functions to store histories of incoming calls and outgoing calls into the application storage unit 3000, update the histories, refer to the histories, and so on.

Among functions of the incoming/outgoing call history management unit 1700, the incoming call history displaying subunit 1710 plays the function to display the incoming call history. More specifically, the incoming call history displaying subunit 1710 has a function to refer to the incoming call history data 3100 and instruct the displaying unit 1300 via the control unit 1500 to display the incoming call history.

The mail history management unit 1800 includes an incoming mail history displaying subunit 1810, and has functions to manage histories of incoming mails and outgoing mails. More specifically, the mail history management unit 1800 has a function to store histories of incoming mails and outgoing mails, text bodies of the mails and so on into the application storage unit 3000, update them, and refer to them.

Among functions of the mail history management unit 1800, the incoming mail history displaying subunit 1810 plays a function to display the incoming mail history. The incoming mail history displaying subunit 1810 has a function to refer to the incoming mail history data 3200 and instruct the displaying unit 1300 via the control unit 1500 to display the incoming mail history.

The reception management unit 1900 includes a blocking subunit 1910, and has a function to judge whether to accept incoming calls and incoming mails. The reception management unit 1900 also has a function to register telephone numbers and mail addresses into the application storage unit 3000, and update, delete and refer to the telephone numbers and the mail addresses.

More specifically, the reception management unit 1900 is notified of a telephone number by the control unit 1500, that has detected an incoming call or the like, judges whether the number is to be blocked, and returns the judgment result to the control unit 1500. If the telephone number is not to be blocked, the control unit 1500 instructs the audio processing unit 1400 to output the ringtone or the like to inform the user of the incoming call, and perform normal call processing. If the number is to be blocked, the control unit 1500 does not instruct the audio processing unit 1400.

Also, according to need, the control unit 1500 notifies the incoming/outgoing call history management unit 1700 and so on of the incoming call. Based on this notification, the incoming/outgoing call history management unit 1700 and so on stores the history in the application storage unit 3000.

The blocking subunit 1910 judges whether a telephone number is to be blocked, according to an inquiry from the control unit 1500.

Note that part or all of the processing performed by each of the units, such as the control unit 1500, is realized by the CPU performing various computer programs.

<Data>

Figure 2:
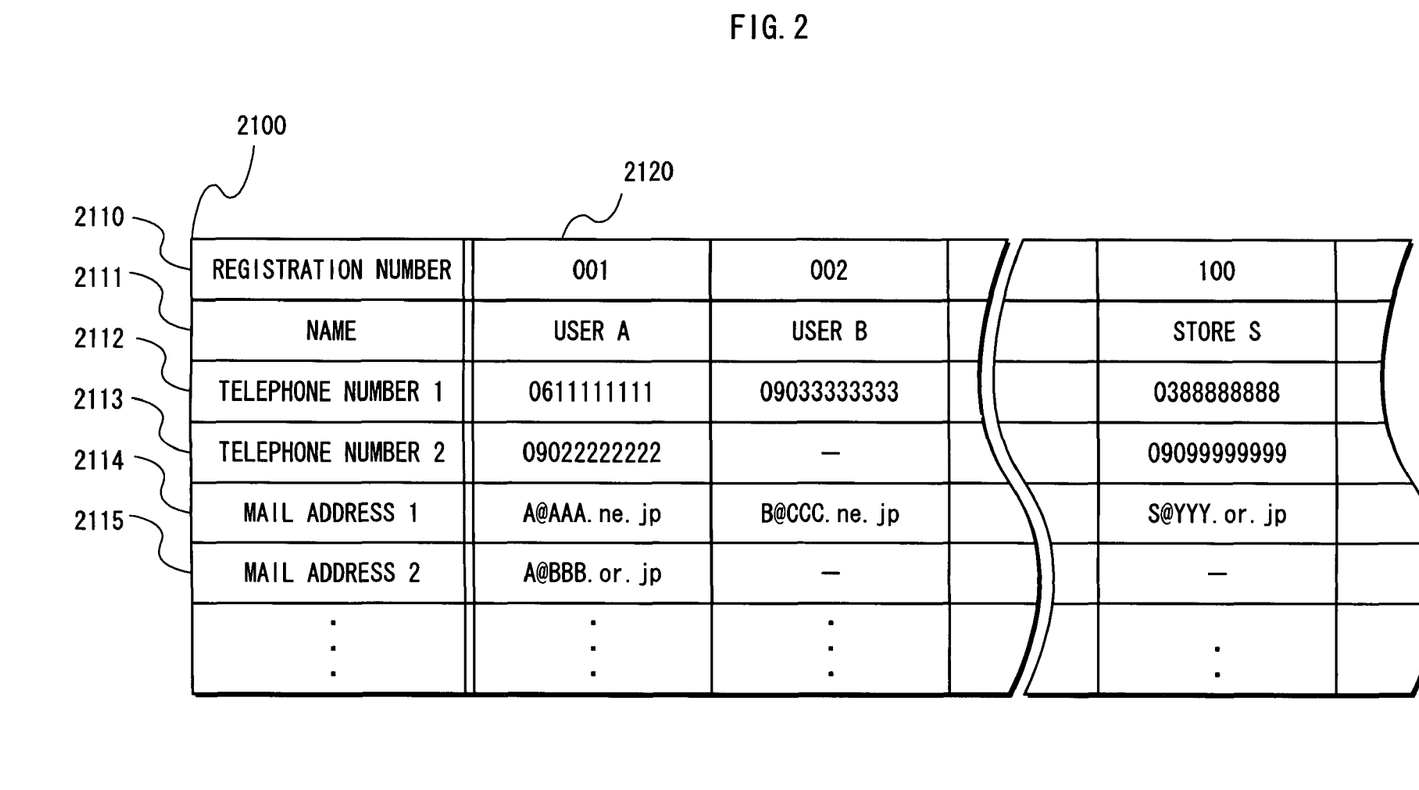
FIG. 2 shows an example structure and example contents of an address book 2100 stored in an address book storage unit 2000.
Figure 3A:
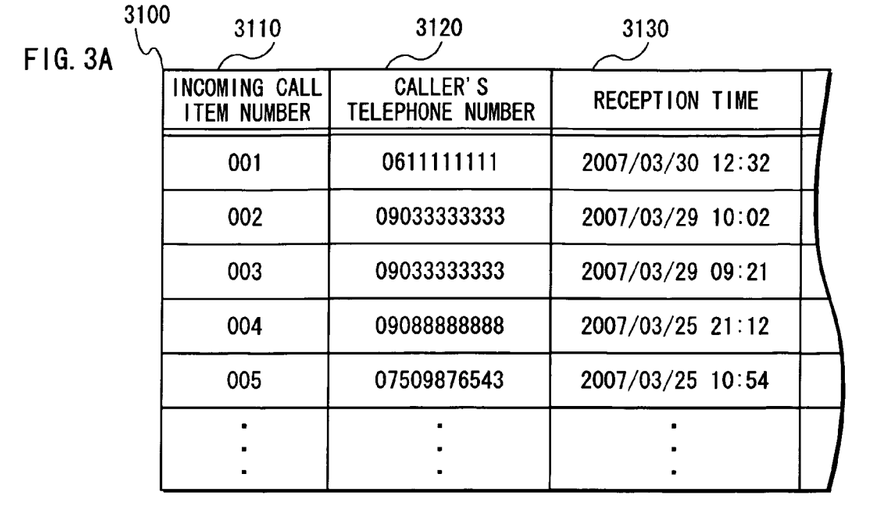
FIG. 3A shows an example structure and example contents of incoming call history data 3100 that is to be stored in an application storage unit 3000.

The following explains principal types of data used by the portable telephone apparatus as an embodiment of the present invention, with reference to FIG. 2 and FIG. 3. FIG. 2 is referred to for explaining the address book 2100 stored in the address book storage unit 2000, and FIG. 3 is referred to for explaining the incoming call history data 3100 stored in the application storage unit 3000.

FIG. 2 shows an example structure and example contents of the address book 2100. The address book 2100 is data stored in the address book storage unit 2000 of the portable telephone apparatus 1000.

The address book 2100 includes items such as a registration number 2110, a name 2111, a telephone number 1 (2112), a telephone number 2 (2113), a mail address 1 (2114), a mail address 2 (2115), and so on. These items constitute a personal information set 2120 for each of registered communication parties.

The registration number 2110 is an identifier of the personal information set 2120 included in the address book 2100. In this embodiment, the registration number 2110 is represented by "001", "002", and so on.

The name 2111 shows a name of a party registered in the address book 2100.

The telephone number 1 (2112) and the telephone number 2 (2113) are telephone numbers of a party registered in the address book 2100.

The mail address 1 (2115) and the mail address 2 (2116) are mail addresses of a party registered in the address book 2100.

For example, the personal information set 2110 identified by the registration number 2110 "001" includes "USER A" as the name 2111, "0611111111" as the telephone number 1 (2112), "09022222222" as the telephone number 2 (2113), "A@AAA.ne.jp" as the mail address 1 (2114), and "A@BBB.or.jp" as the mail address 2 (2115).

Figure 3B:
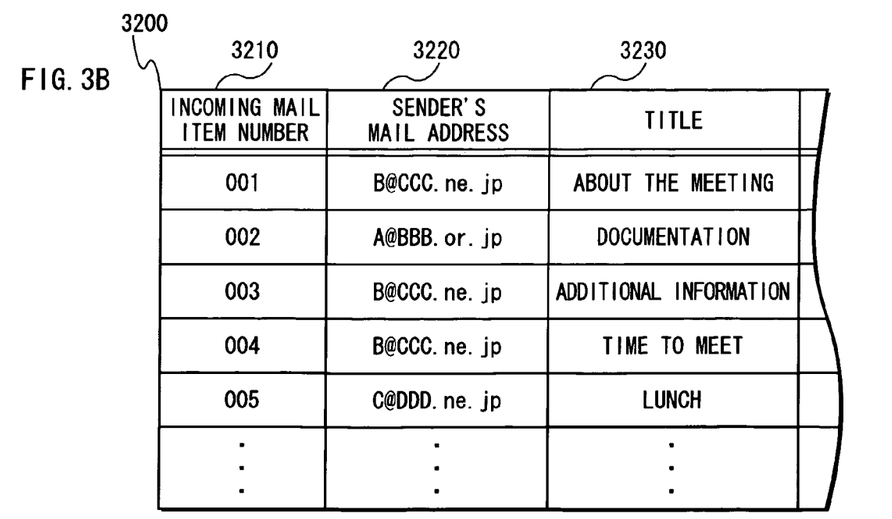
FIG. 3B shows an example structure and example contents of incoming mail history data 3200 that is to be stored in the application storage unit 3000.
Figure 3C:
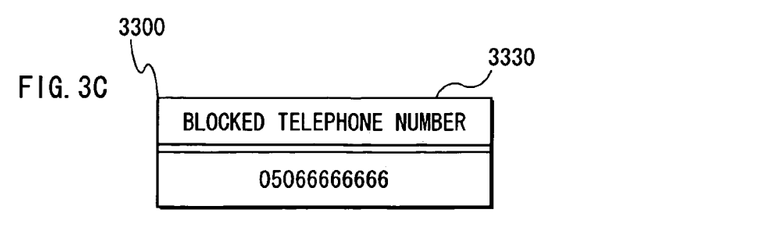
FIG. 3C shows an example structure and example contents of blocked-number data 3300 that is to be stored in the application storage unit 3000.

FIG. 3A and FIG. 3B show examples structures and example contents of data used by each of applications stored in the application storage unit 3000. FIG. 3A shows an example structure and example contents of the incoming call history data 3100. FIG. 3B shows an example structure and example contents of the incoming mail history data 3200. FIG. 3C shows an example structure and example contents of the blocked-number data 3300.

The incoming call history data 3100 shown in FIG. 3A is consisted of an incoming call item number 3110, a caller's telephone number 3120, a reception time 3130, and so on.

The incoming call item number 3110 is an identifier of an incoming call. A smaller number shows an earlier reception time.

The caller's telephone number 3120 shows the telephone number of the caller of an incoming call, and the reception time 3130 shows the time when an incoming call is received.

For example, the most recent incoming call is a call that is identified by an incoming call item number 3110 "001" and was originated from a caller's telephone number 3120 "0611111111" at a reception time 3130 "2007/03/30 12:32" that represents 12:32 on Mar. 30, 2007.

The incoming mail history data 3200 shown in FIG. 3B is consisted of an incoming mail item number 3210, a sender's mail address 3220, a mail title 3230, and so on.

The incoming mail item number 3210 is an identifier of an incoming mail. A smaller number shows an earlier reception time.

The sender's mail address 3220 shows the mail address of the sender of an incoming mail, and the mail title 3230 shows the tile described in the received mail.

For example, the most recent incoming mail is a mail that is identified by an incoming mail item number 3210 "001", and was originated from a sender's mail address 3220 "B@CCC.ne.jp" and has a title 3230 "ABOUT THE MEETING".

The blocked-number data 3300 shown in FIG. 3C includes a blocked telephone number 3330 that is a telephone number of an incoming call to be blocked. Although there is only one telephone number is included in the blocked-number data 3300 in this embodiment, there may be two ore more, as a matter of course.

<Operations>

The following explains operations performed by the portable telephone apparatus that is described above, with reference to FIG. 4 to FIG. 9.

Figure 4:
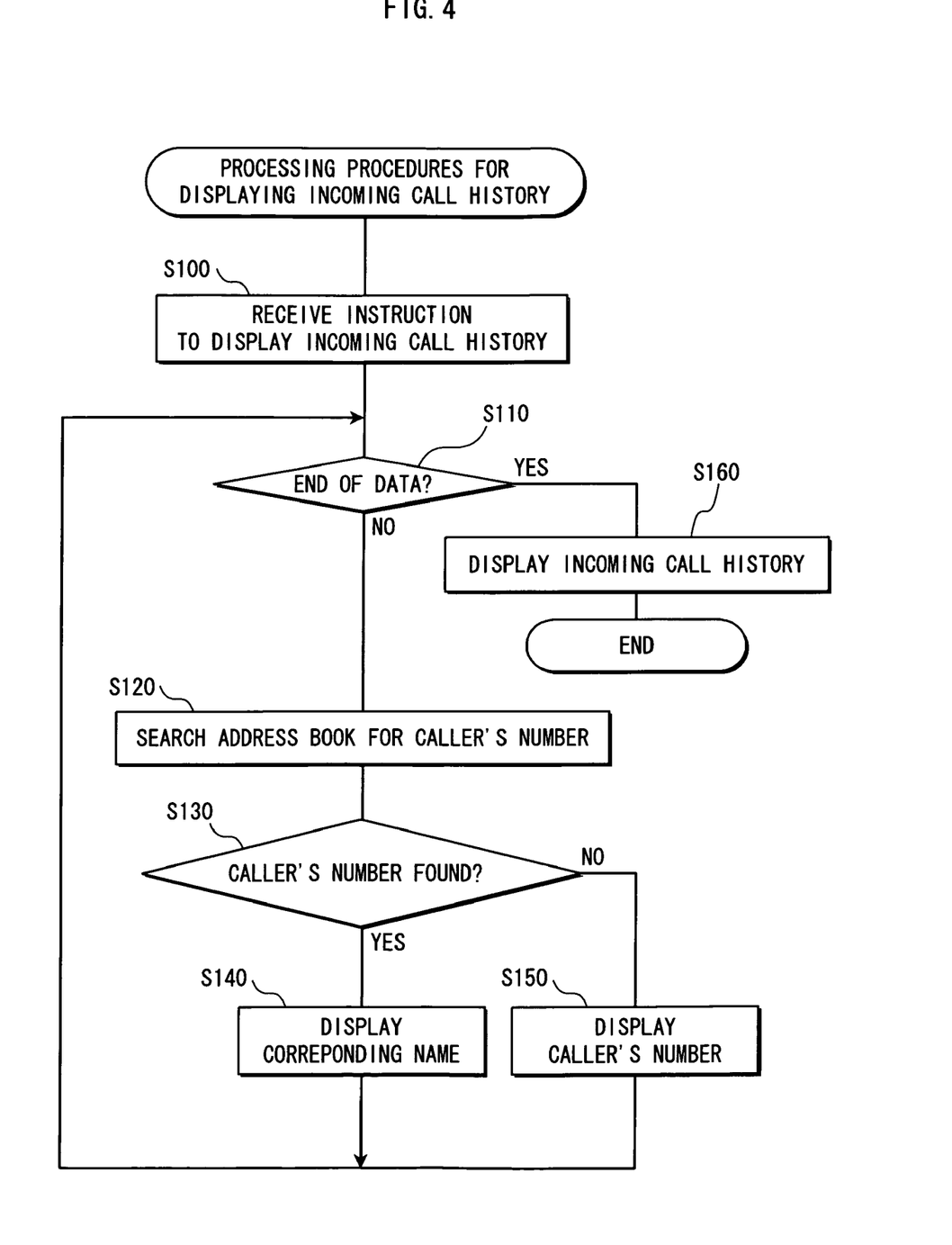
FIG. 4 is a flowchart showing processing procedures for displaying an incoming call history.
Figure 8:
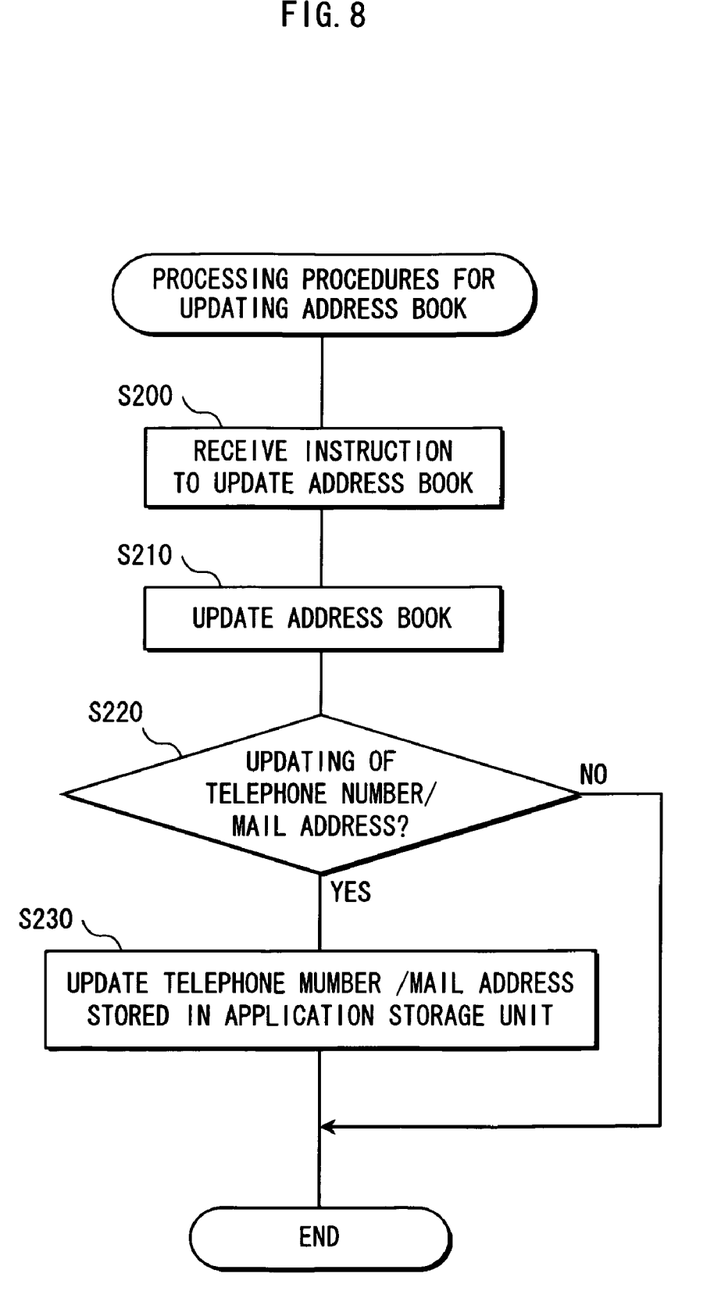
FIG. 8 is a flowchart showing processing procedures for updating the address book.

FIG. 4 is a flowchart showing processing procedures for displaying an incoming call history, and FIG. 8 is a flowchart showing processing procedures for updating the address book.

The present invention is characterized by the processing procedures for updating the address book, as shown in FIG. 8. However, since the processing procedures for displaying an incoming call history is closely related to the address book, the processing procedure for displaying an incoming call history is explained first with reference to FIG. 4. Note that the processing procedures for displaying an incoming call history shown in FIG. 4 are the same as those of related art.

For this explanation, the address book 2100 shown in FIG. 2 and the incoming call history data 3100 shown in FIG. 3A, and so on are referred to.

Figure 5A:
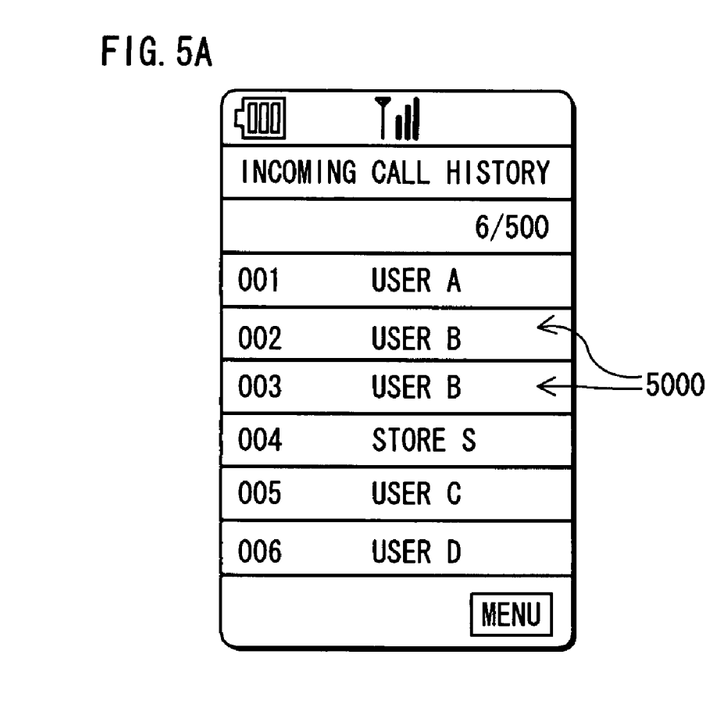
FIG. 5A shows an example of the incoming call history displayed on a displaying unit.
Figure 5B:
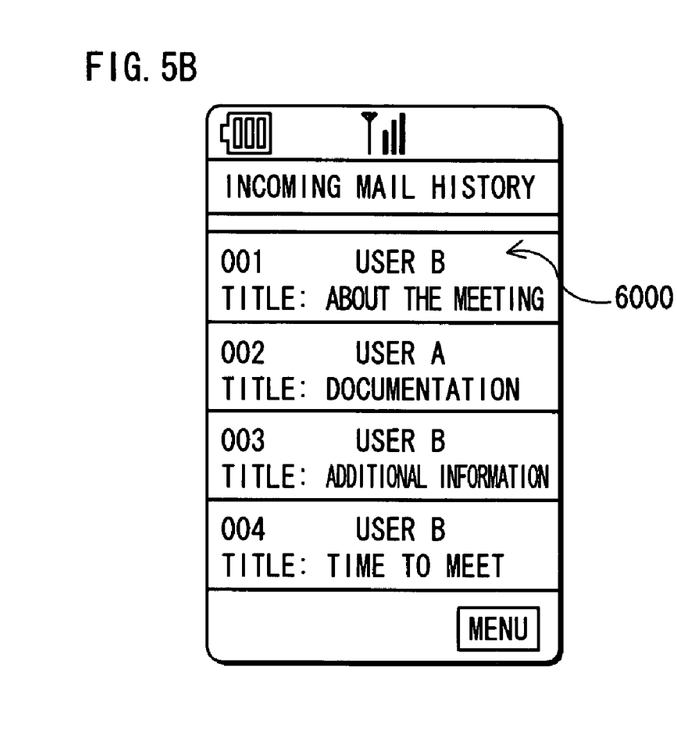
FIG. 5B shows an example of the incoming mail history.

FIG. 5A shows an example of the incoming call history displayed on the display, and FIG. 5B shows an example of the incoming mail history.

After this explanation, an example of the incoming call history and an example of the incoming mail history of a related art address book where a telephone number has been changed are explained with reference to FIG. 6 and FIG. 7A and FIG. 7B. After that, the processing procedures for updating the address book according to the present invention are explained with reference to FIG. 8 and FIG. 9.

<Processing Procedures for Displaying the Incoming Call History>

Firstly, the processing procedures for displaying the incoming call history are explained with reference to FIG. 4.

Via the operation unit 1200, the user provides an instruction to display the incoming call history (Step S100). Specifically, the user holds down a particular button included in the operation unit 1200, for example.

The operation unit 1200 detects the holding down of the button, and informs the control unit 1500 of the holding down.

The control unit 1500 that has been informed analyzes that the holding down of the button is an instruction to display the incoming call history, and instructs the incoming call history displaying subunit 1710 to display the incoming call history.

Upon receiving the instruction, the incoming call history displaying subunit 1710 reads the incoming call history data 3100 (see FIG. 3A), and conducts a search to check whether a telephone number that is the same as the caller's telephone number 3120 is included in the telephone number 1 (2112) or the telephone number 2 (2113) of the address book 2100 (Step S120). This search is repeated till the end of the incoming call history data (Step S110) in the ascending order of the incoming call item numbers 3110.

If the telephone number that is the same as the caller's telephone number 3120 has been found in the address book 2100 (Step S130: YES), the incoming call history displaying subunit 1710 displays a corresponding name 2111 (Step S140). If not, the incoming call history displaying subunit 1710 displays the caller's telephone number 3120 (Step S150). Specifically, the incoming call history displaying subunit 1710 generates a data to be displayed, and insert the name 2111 or the caller's telephone number 3120 into the generated data.

Upon generation of the data of the incoming calls to be displayed, the incoming call history displaying subunit 1710 transmits the generated data to the display via the control unit 1500 (Step S160).

Note that in this embodiment, although the search for the caller's telephone number is conducted till the end of the incoming call history data to generate the data to be displayed, part of the incoming call history data may be searched according to the amount of the data.

FIG. 5A shows the incoming call history that is displayed in the above-described manner.

For example, when displaying a history item whose incoming call item number 3110 is "002" among history items included in the incoming call history data 3100 (See FIG. 3A), the incoming call history displaying subunit 1710 searches the address book 2100 (See FIG. 2) for a corresponding caller's telephone number 3120, that is "09033333333".

As a result of the search, a telephone number 1 (2112) of a personal information set 2120 whose registration number 2110 is "002" will be found.

Therefore, when displaying the history item whose incoming call item number 3110 is "002", the incoming call history displaying subunit 1710 displays a name 2111 "USER B" of the personal information set 2120 whose registration number 2110 is "002". The same applies to the case of displaying a history item whose incoming call item number 3110 is "003" (See FIG. 5A, history items 5000).

FIG. 5B shows the incoming mail history. The incoming mail history is displayed through almost the same procedures as the processing procedures for displaying an incoming call history. The difference is that a sender's mail address 3220 is searched for in the processing procedures for displaying the incoming mail history whereas a caller's telephone number 3120 is searched for in the processing procedures for displaying the incoming call history.

For example, when displaying a history item whose incoming mail item number 3210 is "001" among history items included in the incoming mail history data 3200 (See FIG. 3B), the incoming mail history displaying unit 1810 searches the address book 2100 (See FIG. 2) for a corresponding sender's mail address 3220, that is "B@CCC.ne.jp". Here, the mail address 1 (2114) and the mail address 2 (2115) (See FIG. 2) are the targets of the search.

As a result of the search, a mail address 1 (2114) of a personal information set 2120 whose registration number 2110 is "002" will be found.

Therefore, when displaying a history item whose incoming mail item number 3210 is "001", the incoming mail history displaying unit 1810 displays a name 2111 "USER B" of the personal information set 2120 whose registration number 2110 is "002" (See FIG. 5B, a history item 6000).

Note that the mail title 3230 is also displayed in this embodiment.

<Updating of Address Book and Incoming Call History of Related Art>

FIG. 6 shows an example of the address book 2100 where a telephone number has been changed.

In this example, the telephone number 1 (2112) of the "USER B" (as the name 2111) has been changed from "0903333333" to "09012345678" (See the telephone number 2190).

Figure 7A:
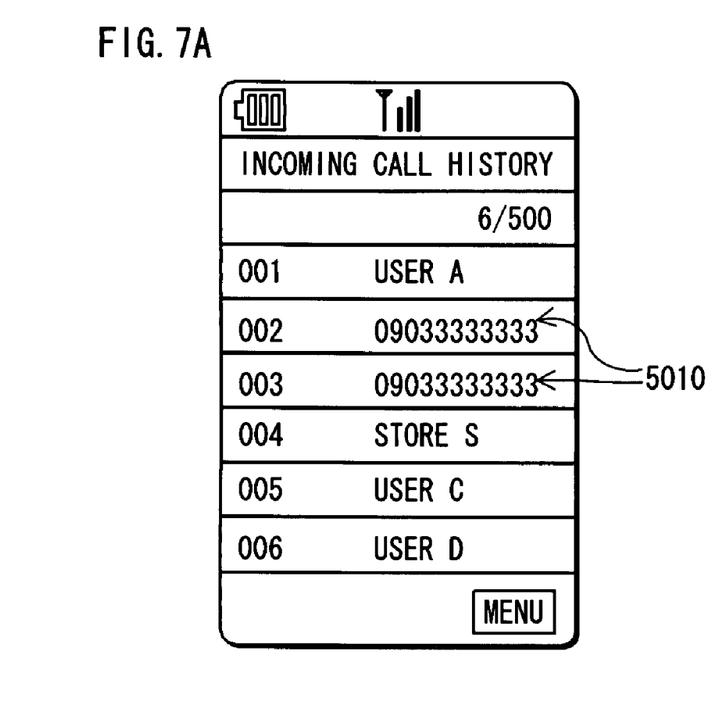
FIG. 7A shows an example of the incoming call history.

FIG. 7A shows an example of the incoming call history displayed through the processing procedures for displaying the incoming call history using the changed data.

For example, when displaying a history item whose incoming call item number 3110 is "002", the incoming call history displaying subunit 1710 searches the address book 2100 for a corresponding caller's telephone number 3120, that is "09033333333" (Step S120 of FIG. 4). In this case, since the address book 2100 does not includes the telephone number "09033333333" as shown in FIG. 6 (Step S130 of FIG. 4: NO), the caller's telephone number are displayed as it is (Step S150 of FIG. 4, See FIG. 7A, history items 5010).

In other words, the name "USER B" is not displayed in the incoming call history, because the data of the address book 2100 has been changed but the incoming call history data 3100 has not been changed (See FIG. 5A and FIG. 7A).

Figure 7B:
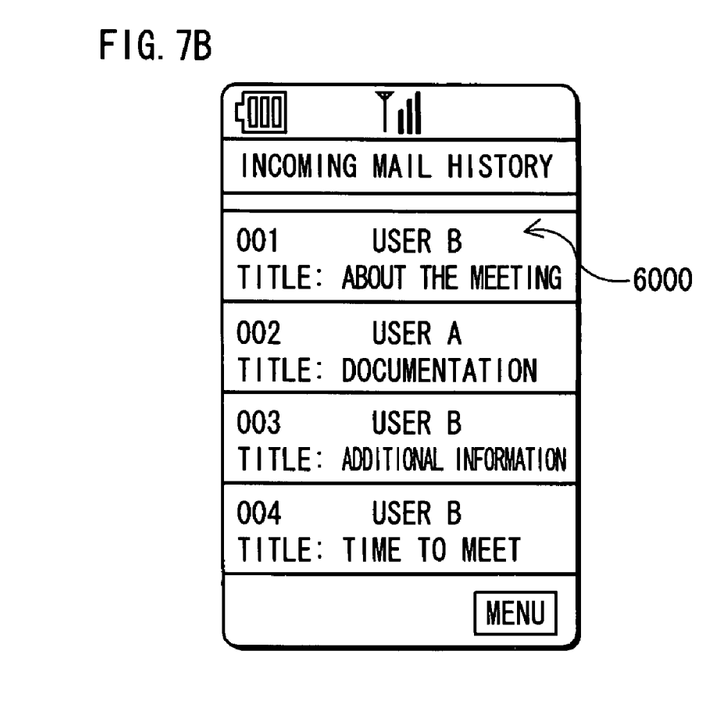
FIG. 7B shows an example of the incoming mail history.

FIG. 7B shows an example of the incoming mail history. Since the mail address of the "USER B" of the address book 2100 has not been changed, the name "USER B" is displayed in the incoming mail history (See a history item 6000 of FIG. 5B and FIG. 7B).

<Updating of Address Book and Incoming Call History of the Present Invention>

Figure 9:
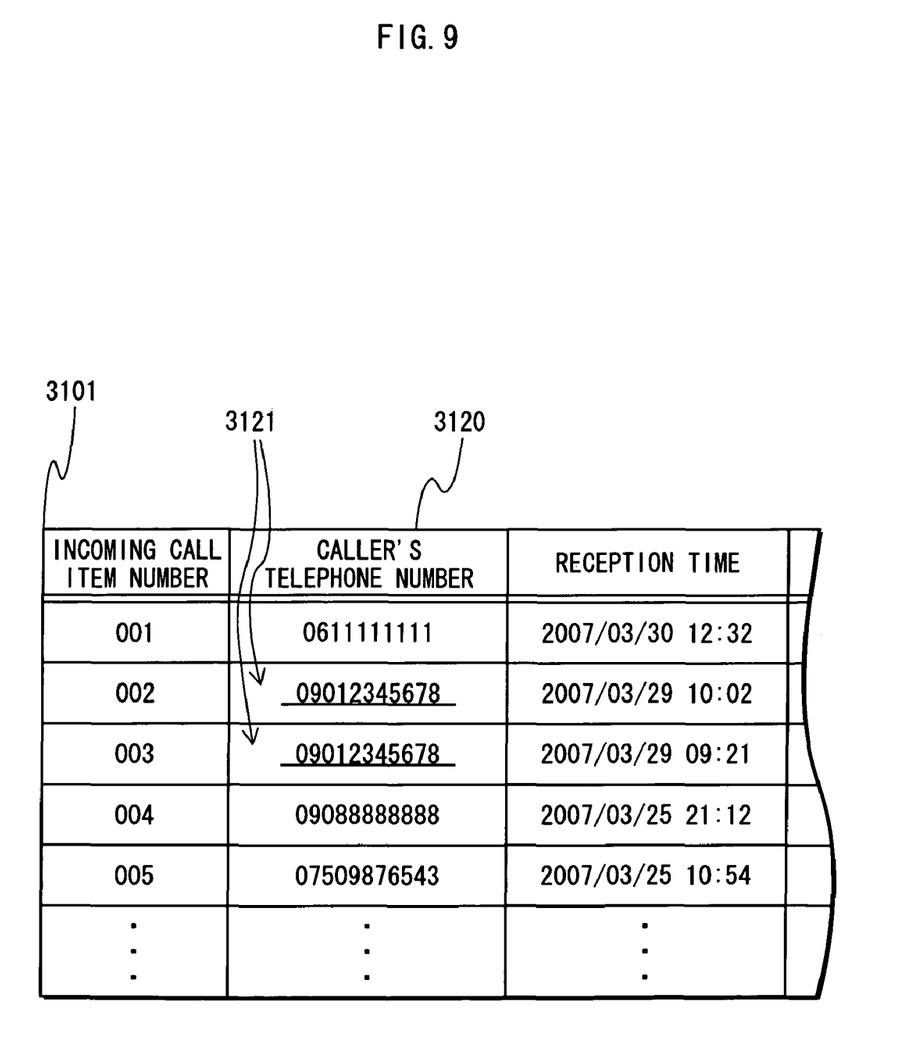
FIG. 9 shows an incoming call history 3101 resulted from the updating of the address book.

Next, processing procedures for updating the address book, pertaining to the present invention, is explained with reference to FIG. 8 and FIG. 9. FIG. 8 is a flowchart showing processing procedures for updating the address book. FIG. 9 is the incoming call history 3101 resulted from the updating of the address book.

Firstly, the user provides an instruction to update the address book 2100, via the operation unit 1200 (Step S200). Specifically, the user selects an option to update the address book from a menu displayed on the displaying unit 1300, for example.

The operation unit 1200 detects the selection of the option, and notifies the control unit 1500 of the detection.

Upon being notified, the control unit 1500 interprets the selection of the option as an instruction to update the address book, and instructs the address book update subunit 1610 to perform the updating.

According to the instruction, the address book update subunit 1610 communicates with the operation unit 1200 and the displaying unit 1300 via the control unit 1500, to perform the updating (Step S210).

Specifically, the control unit gives instructions to the units in order to display a target personal information set 2120 of the address book 2100 (see FIG. 2) to be updated, receive instruction of change, addition, deletion, or the like from the user, and overwrite the personal information set 2120.

According to the related art, that is the all of the processing procedures for updating the address book. However, according to the present invention, the data stored in the application storage unit 3000 are to be updated as well.

Firstly the address book update subunit 1610 judges whether the updated item of the address book 2100 is a telephone number (2112, 2113) or a mail address (2114, 2115) or not (Step S220). This judgment may be made by comparing the updated personal information set and the personal information set before the updating that has been stored, or made based on operations by the user. Accordingly, the only necessity is to store the updated telephone number or the updated mail address, and the telephone number before the updating or the mail address before the updating.

If the updated item of the address book 2100 is a telephone number or a mail address (Step S220: YES), the address book update subunit 1610 searches the data stored in the application storage unit 3000 for the telephone number or the mail address, and overwrites the telephone number or the mail address found by the search with the updated telephone number or the updated mail address (Step S230). Here, if it is a telephone number that has been updated, the address book update subunit 1610 searches through the data that includes telephone numbers. Specifically, the address book update subunit 1610 searches through the incoming call history data and the blocked-number data 3300.

FIG. 9 shows an example of the updated incoming call history 3101.

As FIG. 9 shows, the telephone number before the updating "09033333333" has been replaced with the updated telephone number 2190 "09012345678" shown in the address book of FIG. 6 (See telephone numbers 3121).

The telephone number included in the blocked-number data 3300 is different from the telephone number to be updated. Therefore, the blocked-number data 3300 are not to be rewritten.

If the updated item of the address book 2100 is neither a telephone number nor a mail address (Step S220: NO), the processing finishes.

As explained above, telephone numbers that are stored as items included in the incoming and outgoing call histories, to which the application refers in order to show information of incoming and outgoing calls on the display, will be updated according to the updating of the telephone numbers in the address book. As a result, when displaying the incoming and outgoing call histories, the communication terminal apparatus can display the names associated with the updated numbers.

Specifically, regarding the history of an incoming call originated from an old telephone number, the communication terminal apparatus can display the name that clearly identifies the caller, instead of the old number. The same applies to the case of changing mail addresses.

Also, the telephone number that the application refers to in order to display the name has been updated, to the new number. Therefore, the user can make a call to the updated telephone number by simply selecting the name on the display as usual.

Moreover, the telephone number as to which the notification of the incoming call is to be prohibited is updated according to the updating of the number in the address book. Therefore, it is possible to block the incoming call originated from the number without reconfiguration.

Here, note that the communication terminal apparatus does not necessarily display the incoming call history and the incoming mail history on the display. The communication terminal apparatus may display any information relating to incoming mails and calls and outgoing mails and calls.

The Second Embodiment

The first embodiment explains an example case where a telephone number included in the address book is updated to a new telephone number. The second embodiment explains a case where a single personal information set 2120 (See FIG. 2) includes a plurality of telephone numbers and one of the telephone numbers is deleted.

Figure 10A:
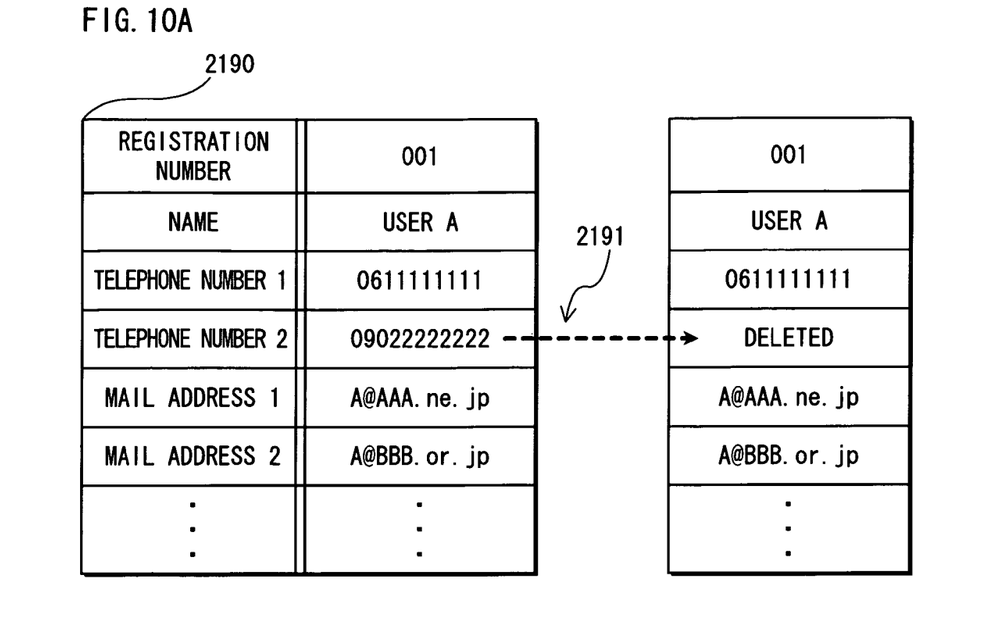
FIG. 10A shows example contents of an address book 2190 from which one of two registered telephone numbers is deleted.
Figure 10B:
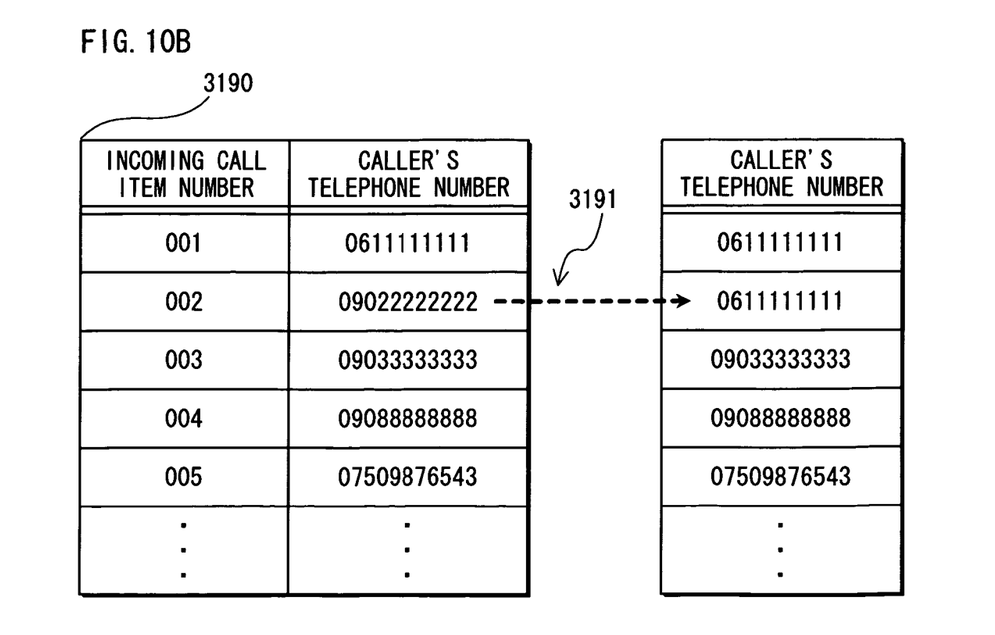
FIG. 10B shows example contents of incoming call history data 3190 changing according to the deletion of the telephone number from the address book 2190 of FIG. 10A.

FIG. 10A shows example contents of the address book 2190 from which one of two registered telephone numbers is deleted. FIG. 10B shows example contents of the incoming call history data 3190 changing according to the deletion of the telephone number from the address book 2190 of FIG. 10A.

If the telephone number 2 "09022222222" of the address book 2190 is deleted (See a dotted arrow 2191 of FIG. 10A), the incoming call history displaying subunit 1710 replaces the deleted number included in the incoming call history data 3190 with the other telephone number (telephone number 1) (See a dotted arrow 3191 of FIG. 10B).

Specifically, the deleted telephone number "09022222222" is replaced with the other telephone number "0611111111". As a result, the incoming call history shows "USER A". If the user calls back using the incoming call history, the user can connect to the USER A without mistakenly connecting to the old number.

Modification Example 1

The second embodiment explains the case where a single personal information set 2120 includes two telephone numbers. A modification Example 1 addresses to the case where a single personal information set 2120 includes three or more telephone numbers, with consideration about which number should replaces the deleted number.

Figure 11A:
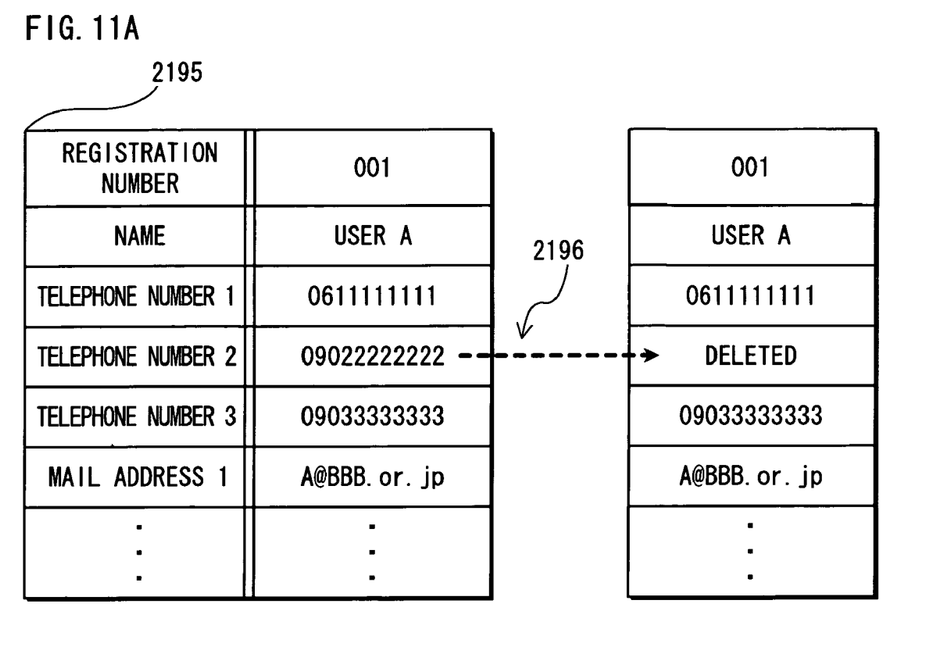
FIG. 11A shows example contents of an address book 2195 from which one of three registered telephone numbers is deleted.
Figure 11B:
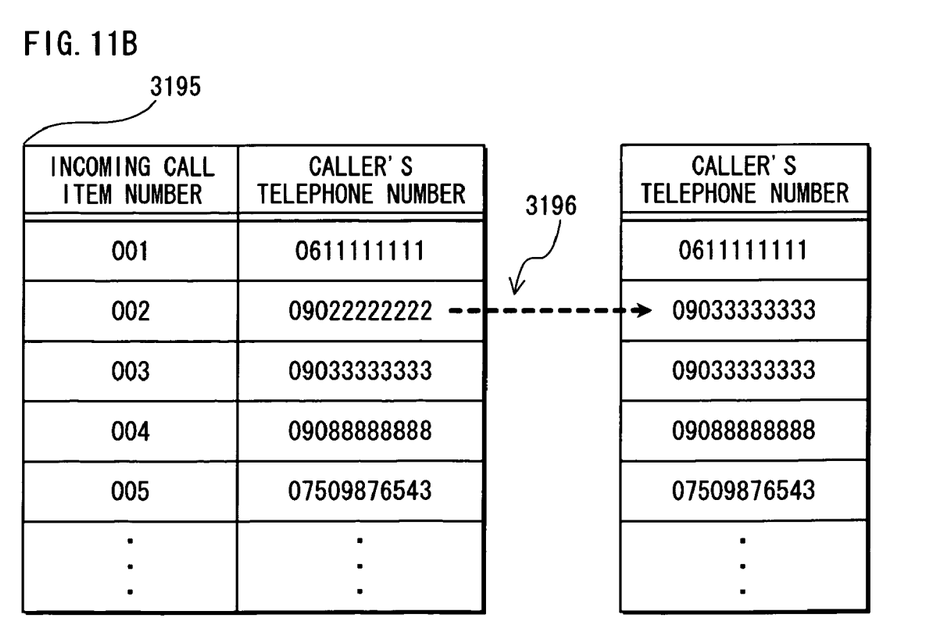
FIG. 11B shows example contents of incoming call history data 3195 changing according to the deletion of the telephone number from the address book 2195 of FIG. 11A.

FIG. 11A shows example contents of an address book 2195 from which one of three registered telephone numbers is deleted. FIG. 11B shows example contents of incoming call history data 3195 changing according to the deletion of the telephone number from the address book 2195 of FIG. 11A.

In this case, the deleted telephone number 2 "09022222222" (See a dotted arrow 3196 of FIG. 1A) is replaced with the telephone number 3 "09033333333", out of the other telephone numbers 1 and 3, namely "0611111111" and "09033333333".

The prefix of the deleted telephone number shows that the number is of a portable telephone. The prefix of the telephone number 3 also shows that the number is of a portable telephone, and the prefix of the telephone number 1 shows that the number is of a regular telephone. Accordingly the deleted portable telephone number is replaced with the other portable telephone number.

This is because replacing the deleted number with a number in the same category as the deleted number can increase the reachability compared to replacing it with a number of a regular telephone.

If all the other numbers are in the same category, in other words, if all the other numbers are numbers of regular telephones or numbers of portable telephones, the deleted number may be replaced according to a predetermined rule, e.g. in the ascending order of the incoming call item numbers. For example, if the other telephone numbers are the telephone number 1 and the telephone number 3, the deleted telephone number may be replaced with the telephone number 1.

Here, as mentioned above, whether a telephone number is that of a portable telephone or that of a regular telephone can be judged based on the prefix of the telephone number, such as "090" and "080".

Mail addresses can be judged based on the domain name.

<Supplemental Description>

The portable telephone apparatuses as embodiments of the present invention are described above. However, as a matter of course, the present invention is not limited to the embodiments described above. A partial modification may be applied to the present invention. Following are modification examples.

(1) Although the incoming call history and incoming mail history are explained above as examples, the present invention may be applied to other histories.

For example, the present invention may be applied to an outgoing call history, an outgoing mail history, and an incoming/outgoing SMS history, and so on. The SMS is a short message addressed to the telephone number of the party.

Note that although mail items of the incoming mail history of the embodiments above are displayed in the order of the reception, they may be displayed in a different manner. For example, regarding mails from the same sender, only the most recent mail may be displayed. The same may apply to the incoming call history.

(2) In the embodiments above, an application for a function of blocking incoming calls is explained as an example other than applications for the function of displaying the incoming call history and the function of displaying the incoming mail history. However, other applications may be used, as a matter of course.

For example, an application for blocking mails from particular mail addresses, or an application for receiving only mails from particular mail addresses may be used.

If this is the case, the application storage unit stores therein the addresses to be blocked or to be received, and if any address of the address book is updated for example, the stored mail address corresponding to the updated address will be rewritten.

Also, in the case of an application for sorting mails based on the mail addresses and storing the mails in separate folders, the sorting will be performed based on the new address.

Regarding audio notes as messages left by the caller using the answer phone function, the recorded telephone numbers will be rewritten so as to identify the callers who left the audio notes.

For example, the telephone number associated with the audio data as an audio note and a call note recorded using an answer phone function is updated according to the updating of the telephone number in the address book. As a result, the communication terminal apparatus can display the name associated with the audio data.

Also, regarding audio data of calls, the recorded telephone numbers will be rewritten so as to identify the callers with whom the calls were made.

Also, regarding applications for simultaneous communication among members, the group registration will be rewritten according to the updating of the address book.

Examples of the applications for simultaneous communication are a PTT (Push To Talk) application, and a text-chat application. Rewriting of the registered telephone number enables the portable telephone can display the names and so on of the participants.

Also, regarding applications for showing the position of a telephone apparatus of a particular telephone number, the particular telephone number will be rewritten according to the update of the address book. As a result, reconfiguration is unnecessary for the application to show the position.

(3) In the embodiments, the address book storage unit and the application storage unit are explained as built-in memories of the portable telephone apparatus. However, they may be portable detachable recording media.

For example, vCard data as electronic name card data may be recorded in an SD card or the like.

(4) Computer programs for instructing the CPU to execute the control processing (see FIG. 8 and so on) for realizing each function of the portable telephone apparatus may be recorded on a recording medium or transmitted via various communication paths and distributed. The recording medium is, for example, an IC card, an optical disc, a flexible disc, a ROM, a flash memory and so on. The distributed program will be stored in a memory that is readable by a CPU of an apparatus. The CPU executes the program, and accordingly each function explained in the embodiments will be realized.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A communication terminal apparatus comprising:
an application execution unit operable to perform prescribed operations for communications;
an address book updating unit operable to delete a first telephone number or mail address included in an address book, the address book including a name and a plurality of telephone numbers or mail addresses corresponding to the name; and
a history updating unit operable to update the first telephone number or mail address to a second telephone number or mail address according to the deleting by the address book updating unit, the first telephone number or mail address being one of a plurality of telephone numbers or mail addresses included in a communication history referred to by the application execution unit, and the second telephone number or mail address being one of the plurality of telephone numbers or mail addresses included in the address book.

2. The communication terminal apparatus of claim 1, wherein
the history updating unit selects the second telephone number or mail address from among the plurality of telephone numbers or mail addresses included in the address book according to a predetermined rule.

* * * * *